United States Patent [19]

Smith et al.

[11] 3,973,439

[45] Aug. 10, 1976

[54] METAL ACETYL ACETONATE COMPOSITION FOR FORMING THERMOPARTICULATING COATING

[75] Inventors: James D. B. Smith, Turtle Creek; David C. Phillips, Pittsburgh, both of Pa.

[73] Assignee: Westinghouse Electric Corporation, Pittsburgh, Pa.

[22] Filed: Apr. 15, 1975

[21] Appl. No.: 568,221

[52] U.S. Cl. .............................. 73/339 R; 73/432 R
[51] Int. Cl.² .......................................... G01K 1/00
[58] Field of Search ............. 73/339 R, 349, 432 R; 310/52, 55, 56

[56] References Cited
UNITED STATES PATENTS

| | | | |
|---|---|---|---|
| 3,427,880 | 2/1969 | Grobel et al. | 73/339 R |
| 3,807,218 | 4/1974 | Carson et al. | 73/28 |
| 3,812,214 | 5/1974 | Markovitz | 260/830 TW |

*Primary Examiner*—Richard C. Queisser
*Assistant Examiner*—John S. Appleman
*Attorney, Agent, or Firm*—R.D. Fuerle

[57] ABSTRACT

A composition is disclosed of a metal acetylacetonate, a resinous carrier, and a solvent. The composition is applied to a portion of an electrical apparatus which is exposed to a gas stream. The solvent in the composition is evaporated to produce a thermoparticulating coating. When the electrical apparatus overheats the metal acetylacetonate in the coating forms particles in the gas stream which are detected by a monitor.

24 Claims, No Drawings

METAL ACETYL ACETONATE COMPOSITION FOR FORMING THERMOPARTICULATING COATING

REFERENCES TO RELATED APPLICATIONS

This application is related to application Ser. No. 426,391 filed Dec. 19, 1973 by Emil M. Fort, Thomas D. Kaczmarek, and David Colin Phillips titled "Sampling System for Power Generators."

This application is also related to application Ser. No. 568,222 filed Apr. 15, 1975 by J. D. B. Smith, J. F. Meier, and D. C. Phillips titled "Blocked Isocyanate Composition For Forming Thermoparticulating Coating."

This application is related to application Ser. No. 390,284 filed Aug. 21, 1973 by J. D. B. Smith and D. C. Phillips titled "Malonic Acid Composition for Thermoparticulating Coating."

This application is related to application Ser. No. 568,219, filed Apr. 15, 1975 by J. D. B. Smith and D. C. Phillips entitled, "Malonic Acid Derivative Composition for Forming Thermoparticulating Coating."

This application is related to application Ser. No. 568,224 filed of even date by J. D. B. Smith and D. C. Phillips titled "Diazonium Salt Composition For Forming Thermoparticulating Coating."

This application is related to application Ser. No. 568,223 filed of even date by J. D. B. Smith, and D. C. Phillips and K. W. Grossett titled "Grease Thermoparticulating Coating."

This application is related to application Ser. No. 568,218 filed of even date by D. C. Phillips, W. M. Hickman, and J. D. B. Smith titled "Multiple Signal Thermoparticulating Coating."

PRIOR ART

U.S. Pat. No. 3,812,214 discloses metal acetylacetonates as hardeners for epoxy resins.

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 titled "Overheating Detector For Gas Cooled Electrical Machine" and in U.S. Pat. No. 3,573,460 titled "Ion Chamber For Submicron Particles." Another monitor, "The Condensation Nuclei Detector," is described by F. W. Van-Luik, Jr. and R. E. Rippere, in an article titled "Condensation Nuclei, A New Technique For Gas Analysis," in Analytical Chemistry 34, 1617 (1962) and by G. F. Skala, in an article titled "A New Instrument for The Continuous Detection Of Condensation Nuclei," in Analytical Chemistry 35, 702 (1963).

As U.S. Pat. Nos. 3,427,880 and 3,807,218 suggest, special coatings may be applied to the apparatus which decompose and form detectable particles at a lower temperature than the usual organic compounds found in the apparatus. For example, those patents mention polyalphamethylstyrene, polystyrene, polymethyl methacrylate, and cellulose propionate which decompose to form particles at 230° to 340°C. Unfortunately, since these machines normally operate at about 50° to 100°C, they may be severely damaged by the time the temperature reaches 230° to 340°C.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic acid do not decompose below 190°C. Others such as acetic acid, are liquids which boil and therefore are unsuitable. Some compounds, such as oxalic acid, decompose at a low temperature but the decomposition products do not include detectable particles. Compounds such as 1,2-diformylhydrazine have some of the desirable properties but cannot withstand several years operation at 50° to 100°C. A few compounds contain toxic or corrosive substances in their decomposition products which may render them unsuitable.

SUMMARY OF THE INVENTION

We have found that metal acetylacetonates can be used in a composition to form a thermoparticulating coating which produces detectable particles. The coating can be made compatible with the other organic compounds in the apparatus. The coating is very stable and can withstand several years operation at 60°C without decomposing, yet still produce detectable particles when the temperature reaches about 90° to 180°C (depending on the particular thermoparticulating compound used). Also, when the coating is heated to about the thermoparticulating temperature of the coating it blisters and becomes a very dark brown color which is a considerable aid in locating the malfunction.

We have also found that the thermoparticulation products of acetylacetonates such as zinc acetylacetonate give a very strong peak at m/e 100 in a mass spectrometer. This is very useful because other particulates from generators do not peak in that area and therefore it is a "window" area which does not obscure the thermoparticulation products of the acetylacetonates.

DESCRIPTION OF THE INVENTION

A composition is prepared of an acetylacetonate in a solution of a resinous carrier. The acetylacetonate may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed acetylacetonate of about 25 to about 1000 microns is suitable.

The composition may be prepared by simply mixing the ingredients, but it is preferable to mix the drier, resinous carrier, and solvent first and then add the acetylacetonate to prevent the occlusion of the drier in the acetylacetonate and thereby obtain a more homogeneous dispersion of the acetylacetonate.

A suitable composition is a resinous carrier, about 20 to about 250 phr (parts by weight per hundred parts of resinous carrier) of an acetylacetonate, and about 25 to about 75% (by weight based on the resinous carrier) of a solvent for the resinous carrier. If the amount of acetylacetonate is less than about 20 phr, the quantity of particles given off during decomposition may be too low to be detected by presently-existing detectors. However, the construction of more sensitive detectors would permit a lower amount of acetylacetonate. If the amount of acetylacetonate exceeds about 250 phr, the composition is thick, difficult to apply, and does not bond well. The preferred amount of acetylacetonate, which generally gives the best results, is about 40 to about 60 phr. If the amount of solvent is less than about 25%, the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc. could also be used. Resins such as polyesters may also require the presence of an organic peroxide as is known in the art. Mixtures of various resins, solvents, or driers are also contemplated.

The thermoparticulating compounds of this invention are metal acetylacetonates. The metal acetylacetonates must decompose between about 60° and about 200°C and produce particles larger than about 25A in order for the particles to be detected with presently-existing monitors. Specifically, suitable metal acetylacetonates have the general formula

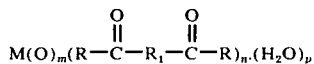

$$M(O)_m(R-\overset{O}{\overset{\|}{C}}-R_1-\overset{O}{\overset{\|}{C}}-R)_n\cdot(H_2O)_p$$

where each R is independently selected from hydrogen, alkyl, or alkenyl to $C_4$ (linear or branched), phenyl, or substituted phenyl. Higher values of R probably do not form stable complexes with metal cations and either do not thermoparticulate or the products of thermoparticulation are not as easily observed as they are not in the "window" area. Preferably, each R is methyl as these compounds are more readily available. In the formula

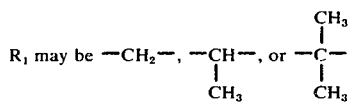

$$R_1 \text{ may be } -CH_2-,\ -\underset{CH_3}{\underset{|}{CH}}-,\ \text{or } -\overset{CH_3}{\overset{|}{\underset{CH_3}{\underset{|}{C}}}}-$$

The $R_1$ group is preferably — $CH_2$ — because these compounds are well known. The M element in the formula is preferably a transition element having an atomic number of 12 to 13, 21 to 30, or 39 to 51 as those compounds give stronger signals at lower temperatures and age better. The preferred M elements are $Zn^{+2}$, $Co^{+2}$, $Co^{+3}$, $Cu^{+2}$, $Cr^{+3}$, $Ni^{+2}$, $Mn^{+2}$, and $Mn^{+3}$ as these compounds give stronger signals at lower temperatures. Zinc acetylacetonate is particularly preferred due to its very low thermoparticulation temperature. The "$m$" in the formula is an integer of 0 or 1. It is needed in the formula because some elements, such as titanium, form acetylacetonates with their oxides. The "$n$" in the formula, which indicates the number of acetylacetonate units that are complexed with the metal ion M, is an integer of 1 to 6. Ordinarily, "$n$" will have a value of only 1 to 3, but dimers may exist which double the value of "$n$." The "$p$" in the formula is an integer of 0 to 3 and indicates the amount of water of hydration. Mixtures of acetylacetonates are also contemplated.

The resinous carrier performs the function of bonding the acetylacetonate to the apparatus since a coating of acetylacetonate by itself does not adhere well. The resinous carrier should be compatible with the other resins used in the apparatus and therefore it is usually advantageous to use the same resin used elsewhere. The resinous carrier is curable at 60°C and is preferably air-dryable since it cannot be easily cured in place with heat. Also, it should be stable after curing for several years at 60°C. The resin must be unreactive with the metal acetylacetonate for otherwise suitable thermoparticulation will not occur. The metal acetylacetonate and the resin form a mixture and the metal acetylacetonate does not catalyze the cure of the resin. Epoxy resins are preferred as they are usually used elsewhere in the apparatus, but polyesters, silicone rubber, styrene, etc. could also be used.

The solvent for the resinous carrier depends on the particular resinous carrier used. Toluene, xylene, benzene, methyl ethyl ketone, ethyl alcohol, diethyl ether, acetone, cellosolve, etc. are common solvents that may be used. Toluene is preferred as it is inexpensive and dissolves most resins.

The composition is applied to portions of the electrical apparatus which are exposed to the gas stream. The coating does not function as insulation and is usually applied on top of insulation, but it can also be applied to conductors. The application may be made by painting, spraying, dipping, grease gun, or other techniques. A suitable coating thickness (after drying) is about 1/16 to about ½ inch. The dispersed particles of acetylacetonate should not be covered with excessive resinous carrier as that may prevent the decomposition particles from escaping into the gas stream. After evaporation of the solvent and room temperature cure of the resinous carrier, if necessary, the apparatus is ready to be operated. When thermoparticulation and the resulting alarm occur, a sample of the gas stream can be collected and analyzed. Since different thermoparticulating compounds can be used in different areas of the apparatus and their thermoparticulation products are different, analysis of the sample can pinpoint the location of the overheating.

The compositions of this invention, particularly those that thermoparticulate at low temperatures such as compositions containing zinc, are useful in areas of generators which are not subject to temperatures much in excess of 60°C. Such areas include the outside surface of the stator windings at the exciter end of a 2-pole, gas-cooled machine with radial gas flow (i.e., at the "cool" end), the outside surface of the stator windings at the exciter end of a water-cooled, 4-pole machine with axial core ventilation, and on the cool end of the stator coil of a 4-pole, gas-cooled machine with axial core ventilation.

The following example further illustrates this invention.

EXAMPLE 1

The following composition was prepared using various metal acetylacetonates:

|  | Parts by Weight |
| --- | --- |
| Metal acetylacetonate | 100 |
| Epoxy resin 50% solids in toluene made from 200 pbw (parts by weight) linseed fatty acids, 200 pbw styrene, and 300 pbw diglycidyl ether of Bisphenol A, sold by Westinghouse Electric Corporation as "B-276" Varnish (See Example 1 of U.S. Patent 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the metal acetylacetonate.

Samples were prepared by brushing the above composition onto 4 inch by 1 inch aluminum and copper sheets 1/16 to ¼ inches thick. The samples were dried to form coatings 1/4 inches thick, then placed in an oven at 60°C for various periods to determine if they were stable and would function after aging.

The samples were placed one at a time in a stainless steel boat within a 1 inch stainless steel tube. Hydrogen was passed over the samples at flow rate of 7 l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6°C/min. heating rate was maintained in each experiment after the insertion of the sample in the boat. The threshold temperature at which considerable particulation occurred was taken from the chart produced by the recorder. The occurrence of particulation was detected using a Generator Condition Monitor or a Condensation Nuclei Monitor. Both instruments are sold by Environment One Corporation.

The following table gives the results:

| Acetylacetonate | Days Aged At 60°C | Thermoparticulating Temperature Range (°C) |
| --- | --- | --- |
| $Zn(C_5H_7O_2)_2 \cdot 2H_2O$ | 110 | 95–100 |
| $TiO(C_5H_7O_2)_2$ | 1 | 222–226 |
| $Al(C_5H_7O_2)_3$ | 44 | 159–161 |
| $Ce(C_5H_7O_2)_3 \times H_2O$ | 44 | >240 |
| $Ca(C_5H_7O_2)_2$ | 4 | >240 |
| $V(C_5H_7O_2)_3$ | 83 | >190 |
| $Fe(C_5H_7O_2)_3$ | 6 | 171–174 |
| $Mg(C_5H_7O_2)_2 \cdot 2H_2O$ | 6 | 192–195 |
| $Mn(C_5H_7O_2)_3$ | 1 | 132–133 |
| $Mn(C_5H_7O_2)_2$ | 1 | 182–185 |
| $Co(C_5H_7O_2)_2$ | 1 | 128–131 |
| $Co(C_5H_7O_2)_3$ | 1 | 150–152 |
| $Cu(C_5H_7O_2)_2 \cdot H_2O$ | 1 | 165–168 |
| $Cr(C_5H_7O_2)_3$ | 1 | 179–183 |
| $Ni(C_5H_7O_2)_2 \cdot 2H_2O$ | 1 | 169–173 |

The above table shows that zinc acetylacetonate has a very low thermoparticulating temperature range, and that cerium and calcium acetylacetonates thermoparticulate at a temperature too high to be useful for warning purposes, although they may be useful in identifying the area of over-heating.

EXAMPLE 2

Using the techniques of Example 1 the aging characteristics of zinc acetylacetonate were determined. The following table gives the results:

| Days Aged At 60°C | Temperature At Initiation of Thermopaticulation (°C) | Temperature At Alarm (°C) |
| --- | --- | --- |
| 1 | 82 | 122 |
| 29 | 91 | 103 |
| 46 | 102 | 130 |
| 118 | 95 | 100 |
| 140 | 108 | 117 |

The above table shows that the thermoparticulating temperature of zinc acetylacetonate remains within a range of 82° to 130°C after aging.

Additional similar experiments with zinc and aluminum acetylacetonate indicate that these components are not stable when aged at 80°C in an atmosphere containing oxygen. However, a zinc acetylacetonate coating of the composition of this example did thermoparticulate at 135° to 162°C after aging for 135 days under nitrogen, and similar results are expected for the aluminum acetylacetonate.

EXAMPLE 3

A composition containing zinc acetylacetonate prepared as in Example 1 was brushed onto copper rectangular blocks (4 × 2¼ × 1½ inches). The coating was allowed to dry overnight at 60°C; total coating build was approximately 10 mils over an area of 31 square inches (end plates not covered).

Each block contained two 650 watt heaters drilled into the copper core; the heaters were connected in parallel (two exit leads). The copper blocks were also equipped with two thermocouples. The blocks were connected to separate inspection plates in a large generator (four sides of block in hydrogen flow); each block being approximately ½ inch from the outer surface of the generator. The generator was 112 inches in diameter by 245 inches long, 2-poles, 26KV(98)MVA).

In the tests, the coated blocks were externally heated by a source of electrical power. The rate of rise of temperature was controlled to ~ 5°C/minute and the hydrogen was monitored for particulate matter by means of an Environment One Generator Condition Monitor.

The following table gives the results:

| Monitor Alarm Temperature | Time of Run | Monitor Flow (meter reading) | Pressure | Speed | Gas Temperature |
| --- | --- | --- | --- | --- | --- |
| 120 to 130°C | 30 min. | 15.0 | 75 psi | 3600 rpm | 46°C |

We claim:

1. A method of protecting electrical apparatus from damage due to overheating and for thereafter determining the location of said overheating, said apparatus including a gas stream and a monitor for detecting particles in said gas stream and for emitting a signal when said particles are detected, comprising:

A. preparing a composition which comprises at least one metal acetylacetonate and a solution of a resinous carrier curable and stable at 60°C, and unreactive with said metal acetylacetonate;
B. applying said composition to said electrical apparatus at positions exposed to said gas stream;
C. evaporating the solvent in said solution; and
D. monitoring said gas stream for the presence of particles therein.

2. A method according to claim 1 wherein said metal acetylacetonate has the general formula:

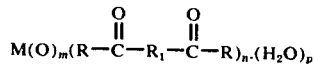

where each R is independently selected from the group consisting of hydrogen, alkyl to $C_4$, alkenyl to $C_4$, phenyl, substituted phenyl, and mixtures thereof, $R_1$ is selected from the group consisting of

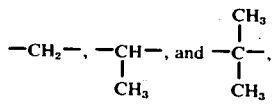

M is an element selected from the group of elements having atomic numbers 12 to 13, 21 to 30, and 39 to 51, $m$ is an integer from 0 to 1, $n$ is an integer selected from 1 to 3, and $p$ is an integer from 0 to 3.

3. A method according to claim 2 wherein each R is $-CH_3$.

4. A method according to claim 2 wherein $R_1$ is $-CH_2-$.

5. A method according to claim 2 wherein M is selected from the group consisting of $Zn^{+2}$, $Co^{+2}$, $Co^{+3}$, $Cu^{+2}$, $Cr^{+3}$, $Ni^{+2}$, $Mn^{+2}$, and $Mn^{+3}$.

6. A method according to claim 1 wherein said acetylacetonate is zinc acetylacetonate.

7. A method according to claim 1 wherein the amount of said compound is about 20 to about 250 phr and the amount of the solvent in said solution is about 25 to about 75% (by weight based on said resinous carrier).

8. A method according to claim 7 wherein the amount of said compound is about 40 to about 60 phr and the amount of said solvent is about 45 to about 55% (by weight based on said resinous carrier).

9. A method according to claim 1 wherein said resinous carrier is an epoxy resin.

10. A method according to claim 9 which includes about 0.1 to about 3 phr of a drier for said epoxy resin.

11. A method according to claim 10 wherein said composition is prepared by first mixing said solution of resinous carrier and said drier and then mixing in said acetylacetonate.

12. A method according to claim 1 wherein the solvent in said solution is toluene.

13. A method according to claim 1 wherein said acetylacetonate is dispersed in said solution.

14. A method according to claim 1 wherein said resinous carrier is air-dryable.

15. A method according to claim 1 including the additional last step of inspecting said apparatus visually for blistered and darkened areas, after a signal has been emitted, to locate the area of overheating.

16. A method according to claim 1 including the additional last steps of collecting a sample of said gas stream after a signal has been emitted, and chemically analyzing said sample.

17. A thermal detection system for electrical apparatus cooled by a gas stream, comprising:
A. a coating on a portion of said electrical apparatus exposed to said gas stream, said coating comprising a solid layer of a cured resinous carrier containing a metal acetylacetonate; and
B. a monitor for detecting the presence of particles in said gas stream.

18. A thermal detection system according to claim 17 wherein said metal acetylacetonate has the general formula:

where each R is independently selected from the group consisting of hydrogen, alkyl to $C_4$, alkenyl to $C_4$, phenyl, substituted phenyl, and mixtures thereof, $R_1$ is selected from the group consisting of

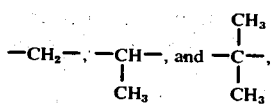

M is an element selected from the group of elements having atomic numbers 12 to 13, 21 to 30, and 39 to 51, $m$ is an integer from 0 to 1, $n$ is an integer selected from 1 to 3, and $p$ is an integer from 0 to 3.

19. A thermal detection system according to claim 18 wherein each R is $-CH_3$.

20. A thermal detection system according to claim 18 wherein $R_1$ is $-CH_2-$.

21. A thermal detection system according to claim 18 wherein M is selected from the group consisting of $Zn^{+2}$, $Co^{+2}$, $Co^{+3}$, $Cu^{+2}$, $Cr^{+3}$, $Ni^{+2}$, $Mn^{+2}$, and $Mn^{+3}$.

22. A thermal detection system according to claim 17 wherein said acetylacetonate is zinc acetylacetonate.

23. A thermal detection system according to claim 17 wherein said resinous carrier is an epoxy resin.

24. A thermal detection system according to claim 23 which includes about 0.1 to about 3 phr of a drier for said epoxy resin.

* * * * *